United States Patent [19]

Idvorian et al.

[11] Patent Number: 4,713,098
[45] Date of Patent: Dec. 15, 1987

[54] TANDEM CURVED ARM STEAM-WATER SEPARATOR

[75] Inventors: Nick Idvorian, St. Catharines; Robert H. Renshaw, Grimsby, both of Canada

[73] Assignee: Foster Wheeler Energy Corporation, Livingston, N.J.

[21] Appl. No.: 825,556

[22] Filed: Jan. 31, 1986

[51] Int. Cl.⁴ .............................................. B01D 45/00
[52] U.S. Cl. ...................................... 55/345; 122/34; 122/488
[58] Field of Search ...................... 55/345, 455, 459 R; 122/34, 488–492

[56] References Cited

U.S. PATENT DOCUMENTS

| | | | |
|---|---|---|---|
| 3,507,099 | 4/1970 | Marshall | 122/488 |
| 3,924,575 | 12/1975 | Zipay | 122/34 |
| 4,289,514 | 9/1981 | Carter et al. | 122/34 |

Primary Examiner—Bernard Nozick
Attorney, Agent, or Firm—Marvin A. Naigur; Warren B. Kice

[57] ABSTRACT

A steam-water separator in which a pair of risers are disposed in tandem within a shell member. The steam-water mixture to be separated is introduced into the lower riser where it is discharged through arcuate arms onto the inner wall of the shell to effect a first stage separation. The remaining portion of the mixture rises upwardly in the shell and passes through a second stage riser. The latter mixture portion discharges through an additional series of arcuate arms against the inner wall of the shell to effect a second stage separation.

7 Claims, 3 Drawing Figures

TANDEM CURVED ARM STEAM-WATER SEPARATOR

BACKGROUND OF THE INVENTION

This invention relates to a steam processing apparatus and, more particularly, to a separator for receiving a mixture of steam and water, separating the steam from the water in two stages and discharging the steam and the water from separate outlets.

In natural circulation vapor generators, mixtures of water and steam rise in heated steam-generating tubes and discharge into a steam-water separator disposed in an elevated position above the tubes and usually in a steam drum. The separators operate to separate the water from the steam with the latter being removed through openings of the upper portions of the drum and the former being recirculated through downcomers to the boiler and back to the steam generating tubes to complete the natural circulation loop.

In these types of arrangements, it is essential that an efficient separation of the steam from the water be effected with minimal pressure loss in order to furnish steam of the required purity to the point of use, and steam-free water to the circulation system. Also, the separators must operate under high steam and water loading and must have sufficient flow area to minimize pressure loss and still achieve separation. Further, there must be low carryover over a wide range of steam and water flow conditions.

SUMMARY OF THE INVENTION

It is therefore an object of the present invention to provide a steam-water separator in which liquid is separated from vapor at a relatively low pressure loss.

It is a further object of the present invention to provide a separator of the above type which can operate under high steam and water loading while maintaining a low pressure loss.

It is a still further object of the present invention to provide a separator of the above type which permits a relatively low carryover over a wide range of steam and water flow conditions.

It is a still further object of the present invention to provide a separator of the above type which is of a simple, efficient and inexpensive design.

It is a still further object of the present invention to provide a separator of the above type in which a primary separator and a secondary separator operate in tandem.

Toward the fulfillment of these and other objects, the steam-water separator of the present invention includes a first stage and second stage riser both of which extend coaxially in a spaced relationship within a shell. A series of curved discharge members extend from each of the risers for discharging the mixture against the inner wall of the shell for effecting a separation of water from the mixture. The mixture from the first riser stage passes upwardly into the second riser stage for further treatment and separation.

BRIEF DESCRIPTION OF THE DRAWINGS

The above brief description, as well as further objects, features and advantages of the present invention will be more fully appreciated by reference to the following detailed description of the presently preferred but nonetheless illustrative embodiment in accordance with the present invention when taken in conjunction with the accompanying drawings in which.

DESCRIPTION OF THE PREFERRED EMBODIMENT

Figure 1:
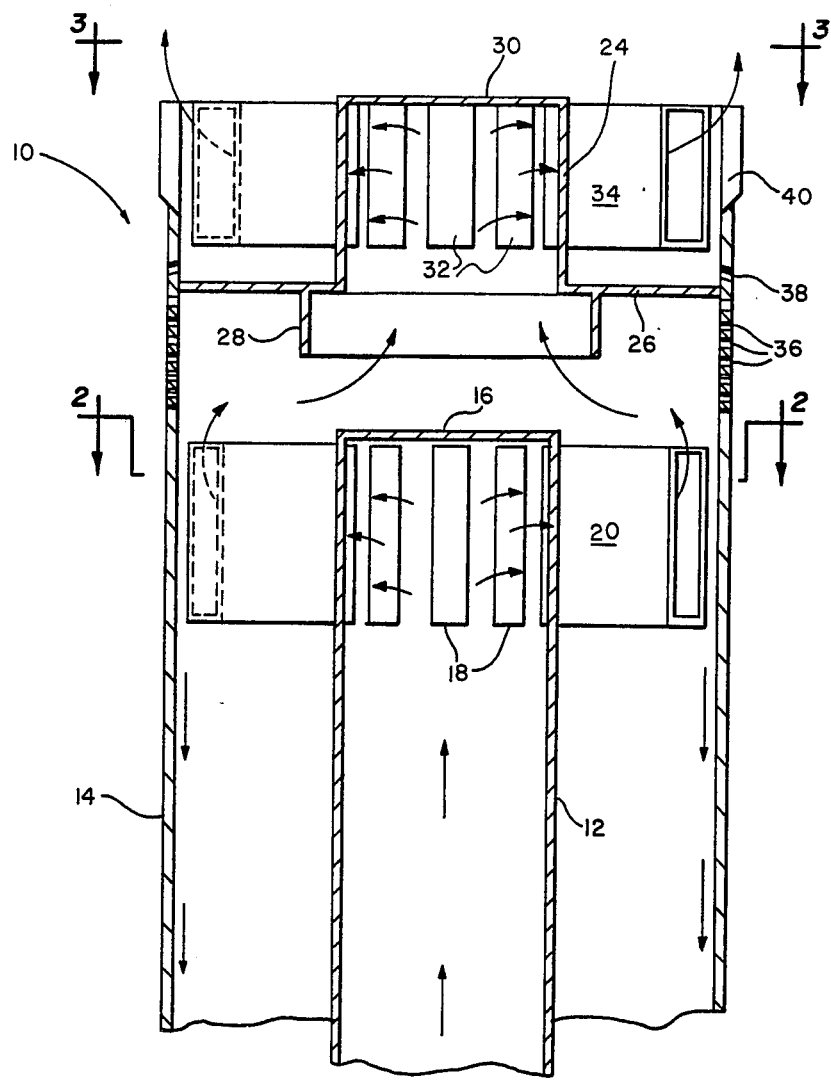
FIG. 1 is a vertical cross-sectional view of the steam-water separator of the present invention.
Figure 2:
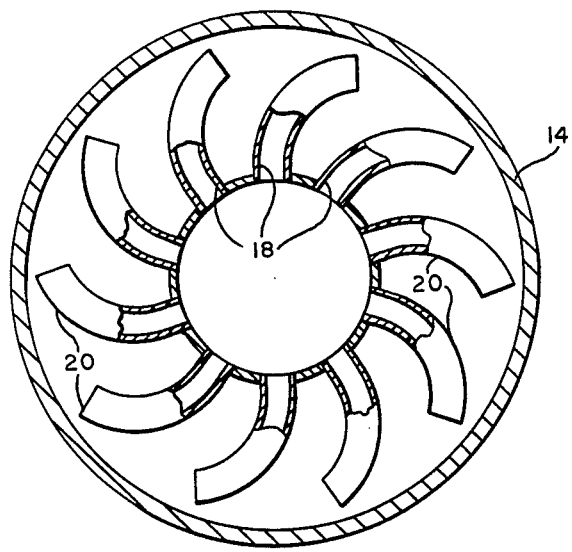
FIG. 2 is a cross-sectional view taken along the line 2—2 of FIG. 1.
Figure 3:
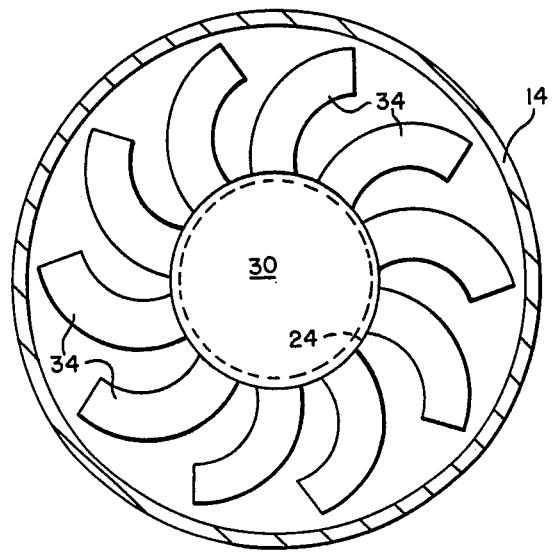
FIG. 3 is a cross-sectional view taken along line 3—3 of FIG. 2.

Referring to FIGS. 1-3 of the drawings, the reference numeral 10 refers in general to the steam-water separator of the present invention. The separator 10 includes a first stage riser 12, which is adapted to receive a steam-water mixture from a riser or tube (not shown) or from a steam drum (not shown) which can be a part of a natural circulation steam generator, or the like. The riser 12 extends within an upright cylindrical shell 14 in a coaxially spaced relationship.

A top plate 16 extends over the upper end of the riser 12 and a plurality of slots 18 are formed through the upper wall portion of the riser. A plurality of arcuate arms 20 are connected to the riser 12 in registry with the slots 18, respectively, with the free ends of the arms being open to permit the steam-water mixture to discharge therefrom in a substantially tangential direction relative to the inner wall of the shell 14. It is understood that support structure (not shown) can be provided within the shell 14 for supporting the riser 12 within the shell in the coaxial position shown.

A second stage riser 24 is provided in the upper portion of the shell 14 in a spaced relation to the riser 12. The riser 24 is supported relative to the shell 14 by a horizontally extending splash ring 26 having a drip ring 28 extending downwardly from the lower portion thereof and adapted to receive the mixture rising in the shell from the first stage separator found by the riser 12 and the arms 20.

A top plate 30 extends over the upper end of the riser 24 and a plurality of slots 32 are formed through the riser. A plurality of arcuate arms 34 are connected to, and extend outwardly from, the riser 24 in registry with the slots 32. The free ends of the arms 34 are open to permit the steam-water mixture to discharge therefrom in a substantially tangential direction relative to the inner wall of the shell 14.

A plurality of water relief holes 36 extend through a portion of the shell 14 between the arms 20 and the arms 34. A series of drain openings 38 are provided immediately above the splash ring 26 and a series of spaced discharge slots 40 are provided in the upper end portion of the shell 14, for reasons to be described in detail later.

In operation, the mixture of steam and water entering the lower end portion of the riser 12 rises upwardly and then passes radially outwardly from the riser through the slots 18 and into arcuate arms 20 where it is directed tangentially against the inner wall of the shell 14. This creates a vortex, or swirling, stream of fluid with the resulting centrifugal forces causing a portion of the mixture, which is largely steam, to travel away from the inner wall of the shell 14 and towards the center of the swirling steam and pass upwardly, by virtue of its buoyancy, into the upper portion of the shell 14. The water portion of the mixture collects on the inner wall of the shell 14 and a portion of this water flows down the wall by gravitational forces and is collected in the steam drum or in any other known manner. The remaining portion of the water collecting on the inner wall of the shell 14 rises upwardly slightly along the inner surface of the shell above the tops of the arms 20 due to the kinetic energy in the jet streams of the steam-water mixture discharging from the arms. This portion of water discharges from the water relief holes 36 and then falls by gravity downwardly into the steam drum, or the like.

The remaining portion of the mixture, which is largely steam, rises upwardly in the shell 14 and is directed into the lower end portion of the riser 24 by the splash ring 26 and the drip ring 28. The mixture then passes radially outwardly from the riser 24 through the slots 32 and through the arcuate arms 34. This causes an additional separation of the steam from the water, with the steam discharging through the slots 40 whereby it leaves the separator for further treatment. The water portion of the mixture collects on the upper inner wall of the shell 14 and passes downwardly through the drain openings 38 where it is collected in the steam drum, or the like.

As a result of the tandem separation achieved by the first and second separator stages thus described, several advantages result. For example, the steam-water separation is achieved at relatively low pressure loss and low carryover over a wide range of steam and water flow conditions. Also, the separator 10 can operate under high steam and water loading while maintaining the low pressure loss. Finally, the separator of the present invention is of a simple, efficient design and is relatively inexpensive to fabricate.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed is:

1. A steam-water separator comprising a first stage riser adapted to receive a steam-water mixture, baffle means disposed in a spaced relation to said riser, at least one discharge slot formed through said riser, an arcuate discharge member registering with each slot for receiving said mixture and discharging it against said baffle means to promote the separation of water from said mixture, said water collecting on said baffle means and said mixture rising by buoyant forces, a second stage riser disposed above said first stage riser, means for directing said rising mixture into said second stage riser, additional baffle means disposed in a spaced relation to said second stage riser, at least one discharge slot formed through said second stage riser, and an arcuate shaped discharge member registering with each latter slot for receiving said riser mixture and discharging it against said baffle means to facilitate additional separation of water from said mixture, said water collecting on said additional baffle means and said mixture rising by buoyant forces for further treatment.

2. The separator of claim 1 wherein said baffle means and said additional baffle means are formed by a shell extending around said first stage riser and said second stage riser.

3. The separator of claim 2 wherein said mixture discharges from the upper end of said shell.

4. The separator of claim 2 wherein said directing means comprises a drip ring extending between said first stage riser and said second stage riser, and a splash plate connecting said drip ring to said shell.

5. The separator of claim 2 further comprising a plurality of openings formed in said shell to permit a radial discharge of a portion of said water.

6. The separator of claim 5 wherein at least a portion of said openings are located just above the discharge members associated with said first stage riser and are adapted to discharge that portion of said water that rises upwardly on the inside surface of said shell due to the kinetic energy of the stream of mixture discharging from said spiral arms.

7. The separator of claim 6 wherein the remaining portion of said water falls downwardly by gravitational forces.

* * * * *